Aug. 17, 1954
J. NIJBOER
2,686,349
MANUFACTURE OF WIRE-SHAPED COMPONENT MEMBERS PROVIDED
WITH ONE OR MORE STRIPS OF TAPE-MATERIAL
Filed June 22, 1950
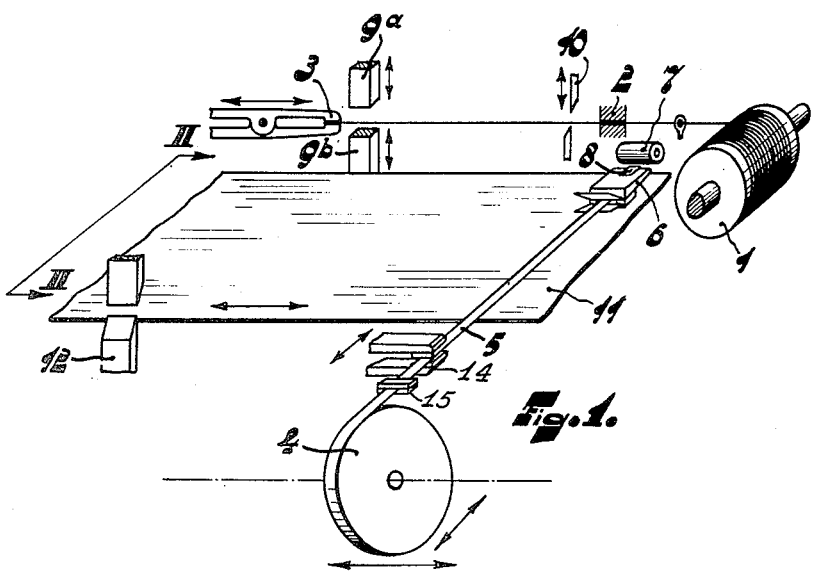
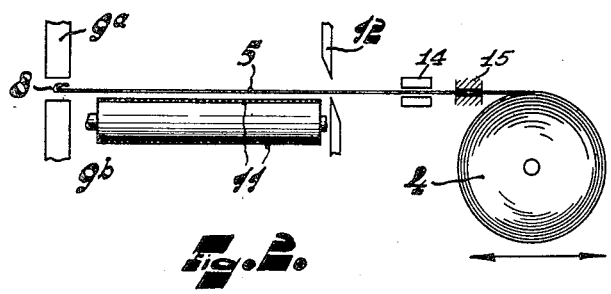
*INVENTOR.*
JOHANNES NIJBOER
BY
AGENT Patented Aug. 17, 1954

2,686,349

UNITED STATES PATENT OFFICE 2,686,349

MANUFACTURE OF WIRE-SHAPED COMPONENT MEMBERS PROVIDED WITH ONE OR MORE STRIPS OF TAPE-MATERIAL

Johannes Nijboer, Eindhoven, Netherlands, assignor to Hartford National Bank and Trust Company, Hartford, Conn., as trustee; patent dedicated to the Public insofar as it relates to lamps and lamp parts to the extent stated in document recorded in the United States Patent Office April 13, 1954

Application June 22, 1950, Serial No. 169,754

Claims priority, application Netherlands July 29, 1949

2 Claims. (Cl. 29—25.15)

The invention relates to a method of manufacturing wire-shaped elements provided with one or more strips of tape-material, for example, cathodes for electron discharge tubes, filaments for incandescent lamps or resistance wires.

In the methods hitherto known, the wire, after having the strip secured to it, is held by a chuck by which it is conveyed further in order to be subjected to any subsequent operation, for example, attachment of a conductor to a flattened part of the wire. With this method of conveying there is a danger, that the wire may be damaged. If the wire is very thin, for example, 8 microns and usually not more than 25 microns, or coated, for example with an emissive substance, the aforesaid known method of conveying is particularly troublesome.

In order to obviate these difficulties the method according to the invention has the feature that a wire of desired length is periodically severed from a magazine reel and has one or more strips secured to it, after which this wire is conveyed further by means of at least one of these strips, if required, to the point of discharge.

This method of conveying is particularly suitable for very thin wires. In general, the strip of tape material is much stronger than the wire, so that there is no risk of damage.

After the wire-shaped element has been conveyed further in the said manner, it may be subjected to various subsequent operations.

According to a preferred embodiment of the invention, the wire-shaped components are conveyed by means of a strip which has not yet been cut to length.

The device for carrying out the method according to the invention is characterised by the provision of means by which the strip, with the wire attached thereto is carried along.

In order that the invention may be readily carried into effect, an example will now be described in detail with reference to the accompanying drawings, in which:

Fig. 1 is a perspective view of the device and Fig. 2 is a section on the line II—II of Fig. 1.

A magazine reel 1 is provided with a supply of wire, said wire being held by a device 2. A chuck 3 periodically pulls a length of wire to the left between the open jaws of a pair of cutters 10 as seen in Fig. 1. A magazine reel 4 has wound on it a supply of tape material 5 held by a device 15. A chuck 14 pulls a length of tape 5 toward a mandrel 6 and pushes the free end of the tape through the mandrel 6 during the movement of the chuck 3. At the same time, a hook-like wire support 8 is made at the end of the tape strip 5 by means of the mandrel 6 and a roller 7. The chuck 14 then returns to its initial position. The magazine reel 4 carrying the strip 5 with the hook 8 at the end then moves to the left and forwards, so that the hook 8 is slipped about the wire between dies 9a and 9b, while the other end of the tape 5 comes between the open jaws of a cutter 12. This is shown in Fig. 2. The hook is then pressed about the wire by closure of the dies 9a and 9b. The wire is then cut to length by closure of the jaws of the cutter 10. The cut portion of the wire is now supported by the tape 5 alone since the jaws of chuck 3 are open, the tape 5 in turn being supported on the reel 4.

The reel 4 now moves to the right (Fig. 2) carrying the tape-supported wire along with it until the wire is on top of a conveyor belt 11, at which time the tape 5 is cut to length by means of the cutter 12. The final product then drops on the conveyor belt and is carried along therewith. The magazine reel 4 with the strip 5 then moves to the right (Fig. 1) for the formation of a new hook.

What I claim is:

1. A method for making wire filaments which comprises the steps of drawing a length of wire from a continuous reel of the same, drawing a tape laterally across the wire, forming a hook in the end of the tape, crimping the hook about the wire, severing the wire to a desired length, transporting the tape carrying the severed wire to a point remote from the point of crimping the tape about the wire, and severing the tape to a desired length.

2. A machine for making wire filament comprising a wire reel, a chuck for drawing a length of wire from the reel, means to draw a tape laterally across the wire, means to form a hook-like bend in the end of the tape, means to crimp the end of the tape around the wire, means to sever the wire to a predetermined length, means to transport the unsevered tape carrying the severed wire to a point remote from the tape crimping means, and cutting means at the latter point for severing the tape to a required length.

References Cited in the file of this patent

UNITED STATES PATENTS

| Number | Name | Date |
| --- | --- | --- |
| 2,182,968 | Lunsford | Dec. 12, 1939 |
| 2,329,769 | Kinyon | Sept. 21, 1943 |